United States Patent [19]

Cox, Jr.

[11] 4,303,425
[45] Dec. 1, 1981

[54] FILTER BAG ASSEMBLY
[75] Inventor: Louis F. Cox, Jr., Augusta, Ga.
[73] Assignee: Menardi-Southern Corp., Augusta, Ga.
[21] Appl. No.: 99,780
[22] Filed: Dec. 3, 1979
[51] Int. Cl.³ .............................................. B01D 46/02
[52] U.S. Cl. ...................................................... 55/378
[58] Field of Search ...... 55/341 R, 341 NT, 341 HM, 55/293, 302, 303–305, 378, 379; 248/94, 100, 101; 210/323 T; 150/10, 3, 8; 285/260; 138/89

[56] References Cited
U.S. PATENT DOCUMENTS

| | | | |
|---|---|---|---|
| 1,274,438 | 8/1918 | Nettleton | 285/260 |
| 1,389,482 | 8/1921 | Beth | 55/378 |
| 2,555,742 | 6/1951 | Grue | 55/507 |
| 2,981,368 | 4/1961 | Johnson | 55/379 |
| 3,812,660 | 5/1974 | Vandenhoeck | 55/341 NT |
| 3,955,947 | 5/1976 | Hoon et al. | 55/304 |
| 4,003,727 | 1/1977 | O'Dell | 55/378 |

Primary Examiner—Bernard Nozick
Attorney, Agent, or Firm—Blum, Kaplan, Friedman

[57] ABSTRACT

A filter bag assembly for a sealed, releasable attachment to a circular cap includes a flexible inelastic wire ring and a substantially concentric elastically expandable member. These elements are enclosed in an external cuff turned on the end of the filter bag. The cap includes a radially extended rim having an external diameter greater than the inside diameter of the wire ring. The cap outer diameter is less than the inside diameter of the wire ring but exceeds the unstressed inside diameter of the expandable member.

13 Claims, 4 Drawing Figures

U.S. Patent   Dec. 1, 1981   4,303,425
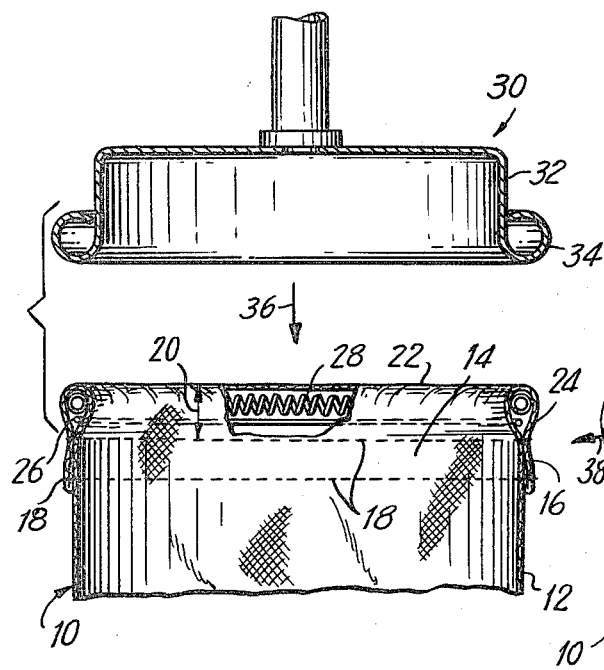
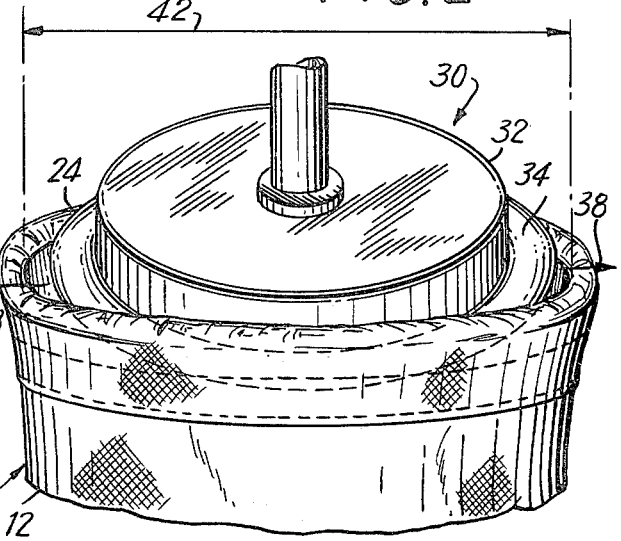
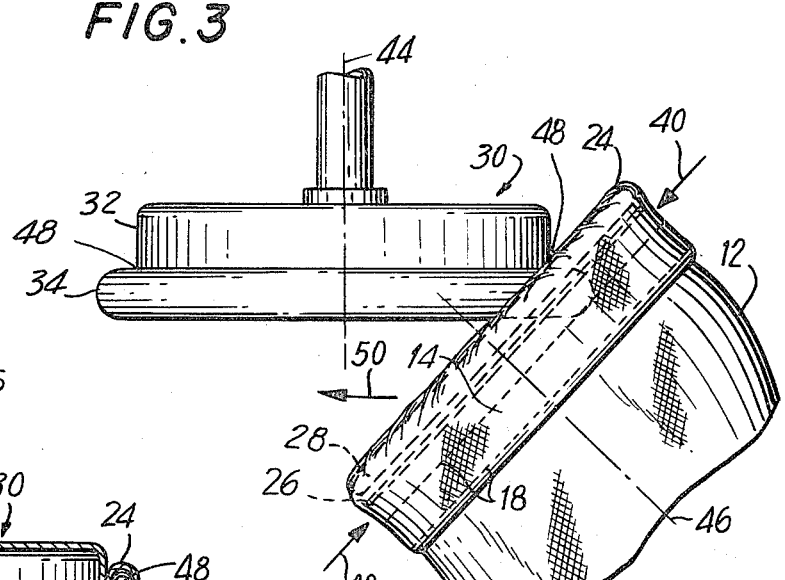
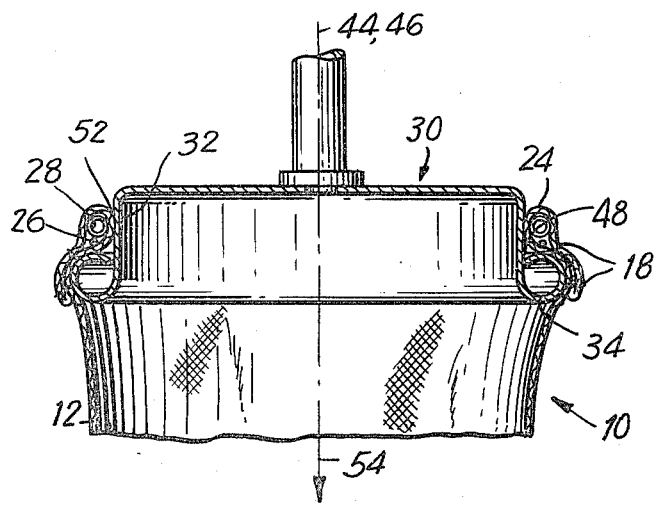

FILTER BAG ASSEMBLY

BACKGROUND OF THE INVENTION

This invention relates generally to a filter bag of the type used to separate particulate matter from a gas stream and more particularly to a filter bag which can be releasably attached and sealed to a cap without the use of separate external clamping elements. One example of the use of such filter bags is in bag houses used in steel mills, cement and limestone plants and the like, where gas-borne particulate matter generated in the manufacturing processes must be separated. Thousands of bags may be used in an industrial installation, and though denominated "bags," these filters are frequently sleeves of extended length, open at both ends. Generally, gas-bearing particulate matter enters a hopper having a tube sheet for its top. The tube sheet is filled with holes, each hole having a collar to which one open end of the filter bag is attached by means of a conventional hose clamp. The tubes extend vertically upward and are attached at the other end to a termination cap which is suspended from a support. Gas leaves the hopper through the tube sheet and passes upward through the filter bag and outward through the wall of the filter bag, leaving behind the particulate matter, which falls back toward the hopper. The cap termination supporting member may be connected to a vibrator which is periodically activated to free particulate matter from the pores of the filter bag. At intervals, the filter bags are replaced in what heretofore has been a labor-consuming effort.

In order to save labor in filtering applications, it is desired that the filter bag be releasably joined to the cap in the simplest and most efficient manner. However, to prevent leakage of particulate matter around the joint between cap and filter bag, it is necessary that a tight seal be provided. Further, the longitudinal forces exerted on the filter bag from the gases discharging against the cap operate to longitudinally separate the filter from the cap unless interference or high friction means or both are provided to prevent such separation. Thus, a desire for simplicity and speed in installing and removing filter bags is compromised by the necessity for prevention of leakage of particulate matter and complete separation of the filter bag from the cap.

As a result, the cap generally includes a radially extending circular flange or rim which is inserted into an open end of the filter bag. A steel band is then tightened around the bag, pressing the bag against the cap in the manner of a hose clamp. The steel band, approximately one-half inch wide, prevents the bag from being pulled over the radial flange or rim. In other applications, only a spring is used in clamping the bag against the cap periphery to provide attachment and sealing. However, as the filter becomes clogged with particulate matter, longitudinal forces build up within the bag which tend to pull the bag from the cap. Thus, the former method requires external clamping elements and time-consuming labor, whereas the later approach is simple but ineffective without further attachment means for holding and sealing the bag to the cap.

What is needed is a filter bag which is quickly and easily attached to the cap without need for external members and provides an effective joint and seal.

SUMMARY OF THE INVENTION

Generally speaking, in accordance with the invention, a filter bag especially suitable for attachment to a circular termination cap is provided. The filter bag includes a flexible inelastic wire ring and a substantially concentric elastically expandable member. These elements are enclosed in an external cuff turned on the end of the filter bag. The cap includes a radially extended rim having an external diameter greater than the inside diameter of the wire ring. The cap outer diameter is less than the inside diameter of the expandable member. Compressing the wire ring into a substantially oval shape allows the end of the bag assembly to be passed over the cap rim. The bag is then pulled down to seat the bag in place. The elastic member contracts against the cap to provide a lateral seal. Interference between the wire ring and radial rim prevents longitudinal separation of the filter bag and cap. No external clamping elements are required for joining and sealing.

The elastic member may be in the form of a coil spring. The filter is made of fabric or any fabric-like material, such as felt, and may be fabricated of any fiber, for example, metal, glass, wool, cotton or plastic. The bag material is selected for compatibility with the temperature, chemical composition and flow rates of the gas and particulate matter.

Accordingly, it is an object of this invention to provide an improved filter bag which is attachable to a termination cap in a simple and effective manner.

Another object of this invention is to provide an improved filter bag which is self-sealing against the termination cap after attachment.

A further object of this invention is to provide an improved filter bag which is effectively and releasably attached to a termination cap without need for external clamping members.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is an exploded, partial elevational view in section of the filter bag assembly of this invention in relation to a termination cap;

FIG. 2 is a top perspective view of the termination cap of FIG. 1 partially inserted into the filter bag assembly of FIG. 1;

FIG. 3 is a side elevational view of the condition shown in FIG. 2; and

FIG. 4 is a partial side elevational view in section of the filter bag assembly of FIG. 1 attached to the termination cap of FIG. 1.

DESCRIPTION OF THE PREFERRED EMBODIMENTS

The filter bag assembly 10 of this invention includes a bag or sleeve portion 12 which terminates at one end in a circular opening 14. The circular end 14 comprises a cuff 16 which is turned over to the outside of the bag 12 and is held in that position by two circular rows of stitches 18. The spacing 20 between the end 22 of the filter bag assembly 10 and the nearest row of stitches 18 leaves an open casing 24 in which are housed a flexible but inelastic circular wire ring 26 and a continuous coil spring 28. The circular wire ring 24 is positioned between the spring 28 and the rows of stitches 18.

FIG. 1 also shows a preferred embodiment of a termination cap 30 to which the filter bag assembly 10 of this invention is releasably attached and sealed. The termination cap 30 is comprised of a body or cylindrical element 32 having an outwardly rolled transverse or radial rim 34. The outer diameter of the body or cylindrical element 32 is less than the inside diameter of the wire ring 26, and the outer diameter of the radially rolled rim 34 exceeds the inside diameter of the wire ring 26. The coil spring 28 in an unstressed condition has an inside diameter which substantially equals or is less than the outside diameter of the cylindrical element 32.

Because of these dimensional relationships, and due to the inelastic qualities of the wire ring 26 and the rim 34, it is not possible to insert the termination cap 30 into the filter bag assembly 10 if the relative motion between them is in the normal direction indicated by the arrow 36. To connect the termination cap 30 with the filter bag assembly 10, it is necessary that the circular opening 14 of the bag 12 be distorted to a substantially oval shape, as shown in FIG. 2. This is accomplished, for example, by pulling on the edge of the opening 14 in opposite directions, as indicated in FIG. 2 by the arrows 38, or by compressing the circular opening 14 by the application of force along the edges, as indicated by the arrows 40 in FIG. 3. As best seen in FIG. 2, when the ring 26 is flexed, the maximum dimension 42 of the casing 24 exceeds the outer diameter of the rim 34, and as seen in FIGS. 2 and 3, the opening 14 in the end of the filter bag assembly 10 is passed over the termination cap 30 by misaligning the longitudinal axis 44 of the termination cap 30 relative to the longitudinal axis 46 of the filter bag assembly 10. The ring 26 is distorted to an oval shape so that it slips readily over the termination cap 30 and into position above the cap. While the ring 26 is being slipped over the termination cap 30, the ring 26 is in a plane substantially perpendicular to the plane of the cap rim 34. After the ring 26 is slipped over the termination cap 30, it is readily turned into a plane parallel to the cap rim 34 and then seated (FIG. 4) by pulling down on the bag or sleeve portion 12.

The result is shown in FIG. 4, where it can be seen that the casing 24 is nested within the shoulder intersection 48 around the entire periphery of the body or cylindrical element 32. The spring 28 contracts to provide a sealed surface joint 52 between the inner surface of the casing 24 and the cylindrical element 32, which prevents out-leakage of particulate matter from the joint. This joint is under continuous compression due to the spring 28 acting through the bag material. The wire ring 26 is positioned well within the outside diameter of the rim 34, and because of the inelasticity of the wire ring 26 and the rim 34, the termination cap 30 cannot be withdrawn from the filter bag assembly 10 by any force acting along the now-collinear axes 44, 46 in the axial direction indicated by the arrow 54. Thus, the rim 34 is a locking member retaining the bag assembly 10 on the termination cap 30 against flow-induced forces.

The filter bag or sleeve portion 12 is fabricated of any conventional filter material, which may be natural or synthetic fabric or a combination of natural and synthetic fabrics. Bags such as sleeve 12 may be fabricated from fabric and fabric-like material such as felt, wool, glass fiber, metal fiber, polyacrylics and the like with satisfactory results. A material is selected for its compatibility with the temperature, chemical composition and flow rates in the duct.

In the embodiment described above, a coil spring 28 is used; it should be understood that any elastic member which provides an expansible member which will contract to sealingly compress the wall of the bag or sleeve portion 12 against the body or cylindrical element 32 may be used. Further, whereas a circular wire, for example, metal, has been described in the embodiment recited above, it should be understood that in alternative embodiments of this invention, the ring 26 may be made of any flexible but inelastic material, such as plastic or even a cable made of fiber or metal strands. In another alternative embodiment of this invention, the stitches 18 may be replaced by other suitable fastening means, for example, rivets, staples, grommets, thermal welding where the materials are suitable. In yet another alternative embodiment of this invention, additional stitches may be located in the casing 24 between the wire ring 26 and the spring 28 so that these elements 26, 28 are in separate compartments of the casing 24.

Further, the body element 32 need not be cylindrical but may be an expanding or tapering conical shape which terminates in a circular shape having a transversely or radially extending rim. In another alternative embodiment of this invention, the rim 34, rather than being rolled and rounded, may be a flat flange extending radially at the end of the body or cylindrical element 32.

It should also be understood that in alternative embodiments of this invention, the flexible, inelastic ring 26 may be a closed oval, parabolic shape or other closed shape, including polygons, when the termination cap is correspondingly contoured and includes a transverse or radially extended rim or flange.

Further, the filter assembly of this invention may be closed at one end and have gas forced into the other open end through an attached duct having a rim or flange at its discharge, the rim or flange being as described above relative to the termination cap 30.

It will thus be seen that the objects set forth above, and those made apparent from the preceding description, are efficiently attained, and since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A combination of a filter bag assembly and a termination cap, comprising:

a termination cap including a body element and a locking member, said locking member surrounding said body element and extending transversely outwardly;

a filter bag element, said filter bag element having an open end and a cuff forming a hollow casing at said open end;

a closed ring supported within said cuff at said open end, said ring being essentially inelastic, at least one transverse dimension of said closed ring exceeding the corresponding transverse dimension of said body element but being less than the corresponding transverse dimension of said locking member;

an elastic member supported within said cuff in a position surrounding said filter bag element at its open end and dimensioned to sealingly engage said filter bag element against said body element, said elastic member surrounds said body element and presses said filter bag element sealingly against said body element, and said ring surrounds said body element, and said ring and locking member dimensions cause interference between said ring and said locking member, said interference maintaining the connection of said filter bag assembly with said termination cap during passage of a flow medium through said filter bag element and preventing flow forces from affecting said seal between said body element and said elastic member.

2. A combination as claimed in claim 1, wherein said locking member is a rim on said body element.

3. A combination as claimed in claim 1, wherein said locking member is a flange on said body element.

4. A combination as claimed in claim 1, wherein said locking member is circular and said closed ring is circular.

5. A combination as claimed in claim 4, wherein the inside diameter of said closed ring is less than the outside diameter of said locking member.

6. A combination as claimed in claim 5, wherein said closed ring is intermediate said elastic element and said locking member.

7. A combination as claimed in claim 5, wherein said body element is cylindrical and the inside diameter of said closed ring exceeds the diameter of said body element.

8. A combination as claimed in claim 7, wherein said cuff is turned out.

9. A combination as claimed in claim 8, wherein said cuff is joined to form said hollow casing by stitches.

10. A combination as claimed in claims 1 or 5, wherein said filter bag element material is selected from the group of fabrics including felt, natural fiber, synthetic fiber, mixtures of natural and synthetic fibers and metal fiber.

11. A combination as claimed in claims 1 or 5, wherein said closed ring material is selected from the group including inelastic metal, plastic and cord.

12. A combination as claimed in claims 1, 4 or 5, wherein said elastic member is a coil spring.

13. A combination as claimed in claim 12, wherein said spring has a circular cross-section and the cross-sectional diameter of said spring exceeds the cross-sectional dimensions of said ring.

* * * * *